United States Patent
Okamoto

(10) Patent No.: US 7,250,707 B2
(45) Date of Patent: Jul. 31, 2007

(54) DRIVING APPARATUS

(75) Inventor: Yasuhiro Okamoto, Tondabayashi (JP)

(73) Assignee: Konica Minolta Opto, Inc., Tokyo (JP)

( * ) Notice: Subject to any disclaimer, the term of this patent is extended or adjusted under 35 U.S.C. 154(b) by 162 days.

(21) Appl. No.: 11/088,369

(22) Filed: Mar. 24, 2005

(65) Prior Publication Data

US 2005/0212384 A1 Sep. 29, 2005

(30) Foreign Application Priority Data

Mar. 29, 2004 (JP) ............... 2004-096698

(51) Int. Cl.
*H01L 41/08* (2006.01)

(52) U.S. Cl. .................. 310/328; 310/323.02
(58) Field of Classification Search ........... 310/323.02, 310/328

See application file for complete search history.

(56) References Cited

U.S. PATENT DOCUMENTS

| | | | | |
|---|---|---|---|---|
| 5,410,206 A | * | 4/1995 | Luecke et al. | 310/328 |
| 5,712,524 A | * | 1/1998 | Suga | 310/328 |
| 5,912,527 A | * | 6/1999 | Karrai | 310/328 |
| 6,188,161 B1 | * | 2/2001 | Yoshida et al. | 310/328 |
| 6,246,157 B1 | * | 6/2001 | Oliver et al. | 310/328 |
| 6,512,321 B2 | * | 1/2003 | Yoshida et al. | 310/316.01 |

FOREIGN PATENT DOCUMENTS

EP 0 675 589 A1 10/1995

* cited by examiner

*Primary Examiner*—Mark Budd
(74) *Attorney, Agent, or Firm*—Brinks Hofer Gilson & Lione

(57) ABSTRACT

A driving apparatus of the invention is arranged to drive an optical lens according to expansion and contraction of an electromechanical transducer. The driving apparatus comprises a fixed member connected to one end of the electromechanical transducer in a direction of expansion and contraction; a friction drive shaft connected to the other end of the electromechanical transducer; a hinge fixedly provided relative to the optical lens; a first frictional connecting part fixedly provided relative to the optical lens; a second frictional connecting part which is movably provided relative to the hinge and grasps the frictional drive shaft in cooperation with the first frictional connecting part from a direction perpendicular to the expansion and contraction direction of the electromechanical transducer; and a spring mounted extending around the optical lens and pinch the first and the second frictional connecting parts between both ends of the spring.

20 Claims, 4 Drawing Sheets

DRIVING APPARATUS

CROSS-REFERENCE TO RELATED APPLICATIONS

This application is based upon and claims the benefit of priority from the prior Japanese Patent Application No. 2004-96698 filed on Mar. 29, 2004, the entire contents of which are incorporated herein by reference.

BACKGROUND OF THE INVENTION

1. Field of the Invention

The present invention relates to a driving apparatus for moving an optical lens in a direction of an optical axis thereof. More particularly, the present invention relates to a driving apparatus constructed of an electromechanical transducing actuator using an electromechanical transducer such as a piezoelectric element, an electrostrictive element, and a magnetostrictive element.

2. Description of Related Art

As a driving apparatus, there has been used an electromechanical transducing actuator for moving a movable unit by utilizing an electromechanical transducer such as a piezoelectric element, an electrostrictive element, or a magnetostrictive element. For example, precision equipment such as a camera, a DVD player, a CD player, an MD player, and an endoscope needs a driving apparatus for moving an optical lens in an optical axis direction. Used as this driving apparatus is the electromechanical transducing actuator. Such driving apparatus constructed of the electromechanical transducing actuator includes a driving apparatus arranged such that a fixed member is fixed to one end of the piezoelectric element or the like while a friction drive shaft is fixed to the other end, and a movable body is frictionally connected to the friction drive shaft. In this driving apparatus, the movable body is pressed against the friction drive shaft by an elastic force of an elastic body for ensuring the frictional connection between the movable body and the friction drive shaft.

Conventionally used as the elastic body for pressing the movable body against the friction drive shaft are a leaf spring, a coil spring, and the like. For example, EP 0 675 589 discloses, in FIG. 18, a leaf spring secured by screws so that a friction drive shaft is interposed between the leaf spring and a movable body. This is arranged to frictionally connect the movable body to the friction drive shaft. In another example, U.S. Pat. No. 6,188,161 has proposed a driving apparatus structured such that a friction drive shaft is grasped by a leaf spring of a complicated shape as shown in FIGS. 10 to 12.

In a compact camera used in for example a cellular phone, however, the movable body such as an optical lens is small in size. This makes it difficult to secure the leaf spring by the screws as described in EP '589. As the spring is reduced in size, a spring constant becomes larger, so that such small springs would be more susceptible to errors caused at the time of manufacture. Consequently, the leaf spring of the complicated shape in the driving apparatus disclosed in U.S. Pat. No. '161 is hard to manufacture. Further, the small spring with a large spring constant would cause deterioration in mounting workability. If such spring is forcedly mounted, the spring would receive excessive force. This may cause plastic deformation of the spring during a mounting work. In this case, the elastic force of the spring would decrease and accordingly the movable body could not obtain a sufficient frictional force.

SUMMARY OF THE INVENTION

The present invention has been made in view of the above circumstances and has an object to overcome the above problems and to provide a driving apparatus with good mounting workability and capable of providing a sufficient frictional force between a movable body and a friction drive shaft by a stable elastic force of an elastic body.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a driving apparatus for moving a driven body according to expansion and contraction of an electromechanical transducer, the driving apparatus comprising: a fixed member connected to one end of the electromechanical transducer in a direction of expansion and contraction; a drive shaft connected to the other end of the electromechanical transducer; a hinge fixedly provided relative to the driven body; a first chuck fixedly provided relative to the driven body; a second chuck movably provided relative to the hinge to move closer to and away from the first chuck and grasp the drive shaft in cooperation with the first chuck from a direction crossing the expansion and contraction direction of the electromechanical transducer; and an elastic body mounted extending around the driven body and pinches the first and the second chucks between both ends of the elastic body.

The driving apparatus of the invention is a driving apparatus utilizing the electromechanical transducer. The drive shaft connected to the electromechanical transducer is grasped by the first and the second chucks. The first chuck is fixedly attached to the driven body. The second chuck is movably attached to the hinge provided in the driven body and accordingly it can be moved closer to and away from the first chuck. The driving apparatus further comprises the elastic body whereby the first and the second chucks are pressed against each other. This elastic body, which is mounted extending around the driven body, is sufficiently longer than the diameter of the drive shaft. An elastic body with a relatively small spring constant can be used, which is excellent in mounting workability. This makes it possible to provide the driving apparatus with the elastic body impervious to plastic deformation. Thus, the driving apparatus can generate a sufficient frictional force between the driven body and the drive shaft by the stable elastic force of the elastic body.

According to another aspect of the invention, there is provided a driving apparatus for moving an optical lens according to expansion and contraction of an electromechanical transducer, the driving apparatus comprising: a fixed member connected to one end of the electromechanical transducer in a direction of expansion and contraction; a drive shaft connected to the other end of the electromechanical transducer; a frame which holds an optical lens; a hinge fixedly provided to the annular frame; a first chuck fixedly provided to the annular frame; a second chuck movably provided relative to the hinge to move closer to and away from the first chuck and grasp the drive shaft in cooperation with the first chuck from a direction crossing the expansion and contraction direction of the electromechanical transducer; and an elastic body mounted extending around the annular frame and pinches the first and the second chucks between both ends of the elastic body.

According to another aspect of the invention, there is provided a driving apparatus for moving an optical lens according to expansion and contraction of an electromechanical transducer, the driving apparatus comprising: a fixed member connected to one end of the electromechanical transducer in a direction of expansion and contraction; a drive shaft connected to the other end of the electromechanical transducer; an annular frame which holds an optical lens; a hinge fixedly provided to the annular frame; a first chuck fixedly provided to the annular frame; a second chuck movably provided relative to the hinge to move closer to and away from the first chuck and grasp the drive shaft in cooperation with the first chuck from a direction crossing the expansion and contraction direction of the electromechanical transducer; and an elastic body mounted extending around the annular frame and pinches the first and the second chucks between both ends of the elastic body, wherein each of the first and the second chucks is formed with a recess which receives an end of the elastic body, on a surface on an opposite side thereof from the facing surface.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of the present invention will now be given referring to the accompanying drawings. In the present embodiment, the invention is applied to a driving apparatus arranged to move an optical lens mounted in a compact camera for a cellular phone and the like along an optical axis thereof by use of an electromechanical transducing actuator.

Figure 1:
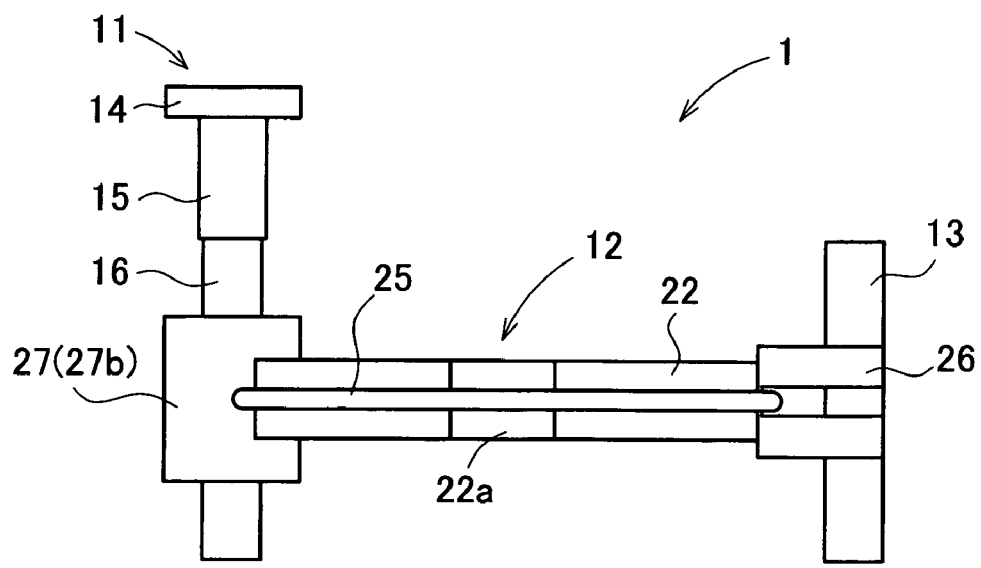
FIG. 1 is a front view of a driving apparatus in an embodiment.
Figure 2:
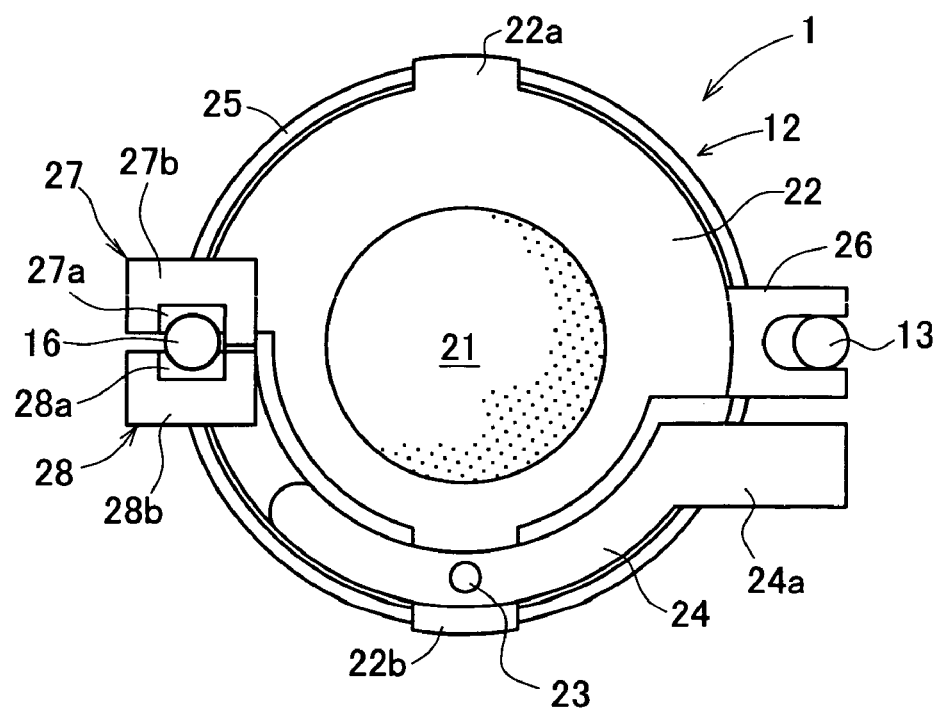
FIG. 2 is a bottom view of the driving apparatus in the embodiment.

A driving apparatus 1 in the present embodiment includes an actuator 11, a movable unit 12 to be moved by the actuator 11, and a guide bar 13 for guiding the movable unit 12 in vertical movement as shown in FIGS. 1 and 2. FIG. 2 is a bottom view of the driving apparatus 1 seen from below in FIG. 1. The actuator 11 has a fixed member 14 to be fixed to a housing or another part of the camera, an electromechanical transducer 15, and a friction drive shaft 16, which are connected in order in an axial direction. The actuator 11 is arranged such that the movable unit 12 frictionally connected to the friction drive shaft 16 is moved in the axial direction by expansion and contraction of the electromechanical transducer 15. The guide bar 13 is placed in substantially symmetrical relation to the friction drive shaft 16 with respect to the movable unit 12 and in parallel relation to the friction drive shaft 16.

The movable unit 12, as shown in FIG. 2, includes an optical lens 21, an annular frame 22 holding the optical lens 21, and a frictional connecting member 24 turnably attached to the annular frame 22. The frictional connecting member 24 is attached to the annular frame 22 with a hinge 23. This hinge 23 is placed at an angle of approx. 90° from both the guide bar 13 and the friction drive shaft 16 with respect to the optical lens 21. A spring 25 is mounted extending around the annular frame 22 and the frictional connecting member 24.

The annular frame 22 is provided with a guided block 26 which is guided by the guide bar 13 and a first frictional connecting block 27 which is frictionally connected to the friction drive shaft 16. The annular frame 22 is further formed with two protrusions 22a and 22b on the periphery at an upper and a lower positions in FIG. 2. In the top face of each of the protrusions 22a and 22b, a groove is formed centrally in the axial direction and extending perpendicular to the axial direction, as shown in FIG. 1. The spring 25 is partially engaged in each groove. The guided block 26 is also formed with a groove in which the spring 25 is engaged.

The frictional connecting member 24 is provided with a second frictional connecting block 28, which is placed facing the first frictional connecting block 27 of the annular frame 22. The friction drive shaft 16 is held, or grasped, by the first and the second frictional connecting blocks 27 and 28 from a direction perpendicular to the expansion and contraction direction of the electromechanical transducer 15. Each of these blocks 27 and 28 includes a metallic transmission part 27a, 28a and a resinous frame 27b, 28b. Each metallic transmission part 27a, 28a is formed with a U-shaped groove extending in the axial direction for increasing a frictional contact area with the friction drive shaft 16.

Figure 3:
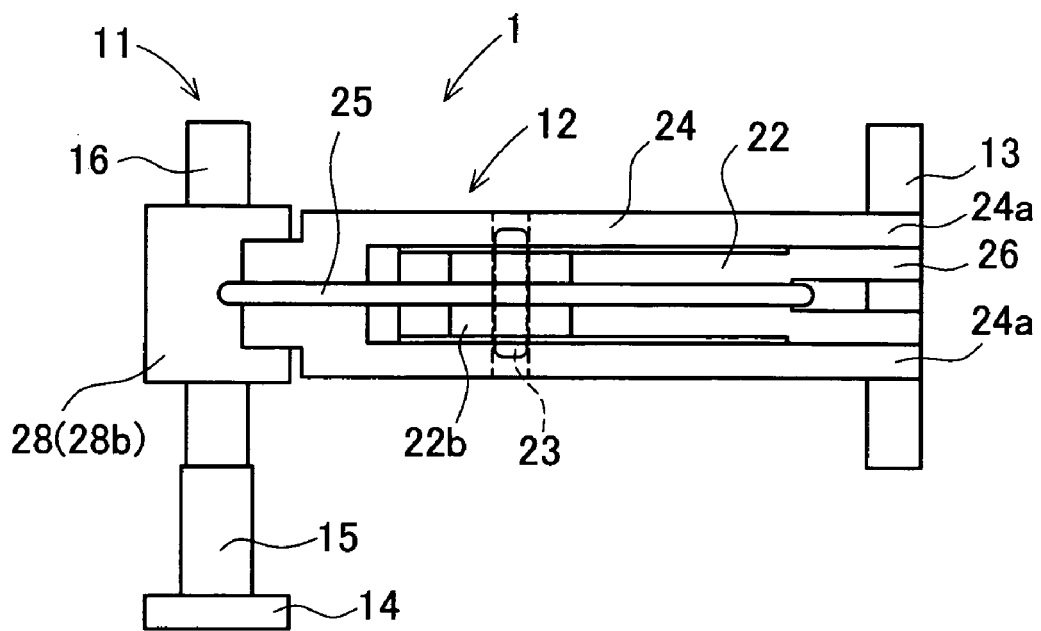
FIG. 3 is another view of the driving apparatus seen from below in FIG. 2.

The frictional connecting member 24 is of a substantially U-shape as shown in FIG. 3, which pinches the protrusion 22b of the annular frame 22 from both sides, above and below, in the axial direction and is fixed to the protrusion 22b with the hinge 23. FIG. 3 is a view of the driving apparatus 1 seen from below in FIG. 2. The frictional connecting member 24 is further formed with a pair of finger pieces 24a at an opposite end from the second frictional connecting block 28. When these finger pieces 24a are manipulated, the frictional connecting member 24 can be turned about the hinge 23. By this manipulation, the second frictional connecting block 28 can be separated from the first frictional connecting block 27.

The spring 25 is a coil spring wound within a single turn. This spring 25 has a length substantially equal to the peripheral length of the annular frame 22, so that the spring constant is relatively small. Instead of circular section, the spring 25 may be of rectangular section or flat-shaped section. Both ends of the spring 25 are engaged in the first and the second frictional connecting blocks 27 and 28 respectively as shown in FIGS. 1 to 3. Specifically, the spring 25 is supported by the first frictional connecting block 27, the protrusion 22a of the annular frame 22, the guided block 26, the protrusion 22b of the annular frame 22, and the second frictional connecting block 28 in order.

Figure 5:
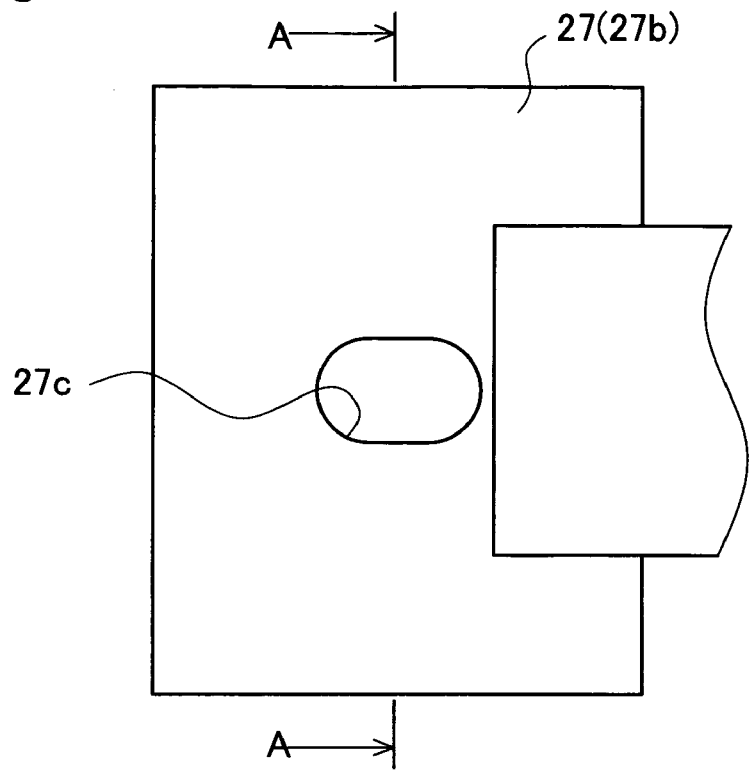
FIG. 5 is an explanatory view showing a first frictional connecting part.
Figure 6:
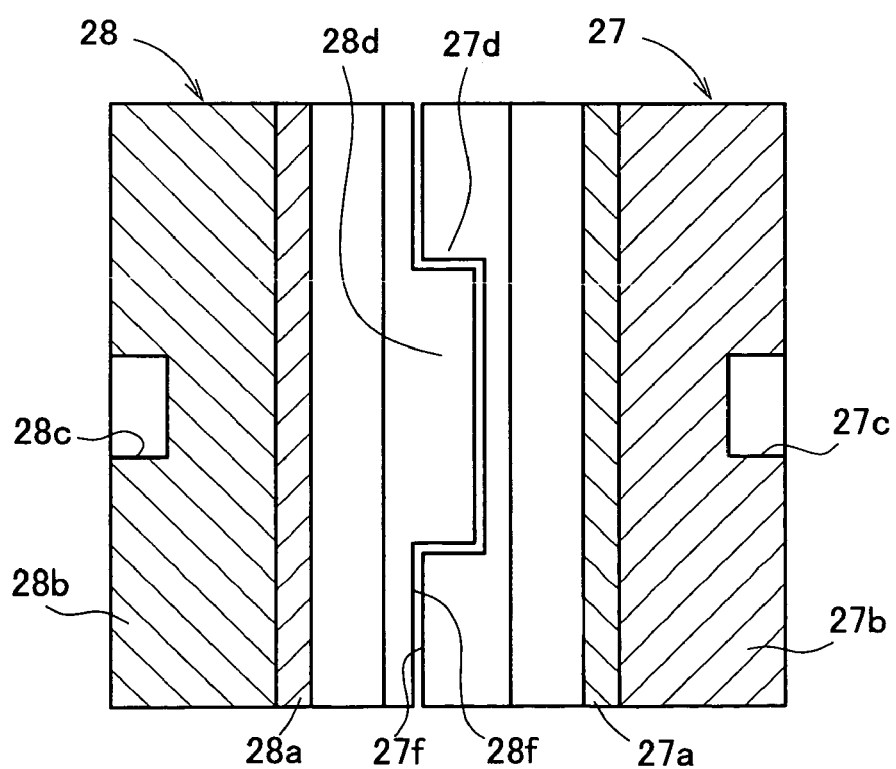
FIG. 6 is a sectional view of the first frictional connecting part and a second frictional connecting part.

The first frictional connecting block 27 from which the spring 25 is removed is shown in FIG. 5, which is a view of the block 27 seen from above in FIG. 2. FIG. 6 is a sectional view of the first and the second frictional connecting blocks 27 and 28 taken along a line A—A in FIG. 5, in which the actuator 11 is not mounted. As shown in these figures, the frame 27b of the first frictional connecting block 27 is centrally formed with a closed-end hole 27c on an outer surface 27e which receives an end of the spring 25. Similarly, the frame 28b of the second frictional connecting block 28 is centrally formed with a closed-end hole 28c on an outer surface 28e which receives the other end of the spring 25.

As shown in FIG. 6, furthermore, the first and the second frictional connecting blocks 27 and 28 are formed with toothed portions 27d and 28d (engagement portions) respectively on facing surfaces 27f and 28f for engagement. When the first and the second frictional connecting blocks 27 and 28 are disposed in face-to-face relation, the toothed portions 27d and 28d are brought into engagement with each other. In this state, accordingly, the first and the second blocks 27 and 28 can be held against dislocation in the axial direction.

The following explanation is made on operations of the driving apparatus 1 constructed as above. In this driving apparatus 1, the first and the second frictional connecting blocks 27 and 28 are pressed against the friction drive shaft 16 of the actuator 11 by the elastic force of the spring 25. With this structure, the movable unit 12 including the optical lens 21 is frictionally connected to the friction drive shaft 16. The actuator 11 is herein arranged such that the electromechanical transducer 15 expands and contracts upon receiving an electric signal, giving an axial driving force to the movable unit 12 frictionally connected to the friction drive shaft 16. Accordingly, the driving apparatus 1 can move the optical lens 21 axially.

Next, the steps of assembling the driving apparatus 1 are explained. Firstly, the actuator 11 and the movable unit 12 are produced individually. The actuator 11 is integrally constituted of the fixed member 14, the electromechanical transducer 15, and the friction drive shaft 16, which are connected with each other by adhesion. The movable unit 12 is assembled in such a way that the frictional connecting member 24 is connected to the annular frame 22 fixedly holding the lens 21 with the hinge 23, and then the spring 25 is mounted extending around the annular frame 22 and the frictional connecting member 24. The spring 25 has a relatively small spring constant and therefore it can be extended to slightly open up the space between its ends so that the spring 25 is mounted by partial engagement with the protrusions 22a and 22b respectively.

Secondly, the actuator 11 is disposed at a predetermined place while it is inserted in a bearing provided in the housing or another part of the camera. Then, the movable unit 12 is placed in such a way that, while the guided block 26 is slidingly mounted on the guide bar 13, the finger pieces 24a and the driven block 26 are pinched by fingers to move the first and the second frictional connecting blocks 27 and 28 away from each other to grasp the friction drive shaft 16 between the metallic transmission parts 27a and 28a each having a U-shaped groove. Since the spring constant of the spring 25 is small and the frictional connecting member 24 can turn about the hinge 23, the above mounting work is easy. Accordingly, no excessive force needs be applied to the spring 25 and others, so that there is no possibility of causing plastic deformation of the spring 25.

According to the driving apparatus 1 in the present embodiment as described above in detail, the spring 25 is mounted along the periphery of the annular frame 22 holding the optical lens 21. The spring 25 pinches the first and the second blocks 27 and 28 between the ends of the spring 25 to press the blocks 27 and 28 against the friction drive shaft 16. The length of the spring 25 is determined to be substantially equal to the peripheral length of the annular frame 22, so that the spring constant can be relatively reduced. This makes it easy to extend and mount the spring 25, achieving an improvement in workability. Consequently, the spring 25 can provide a stable elastic force without plastic deformation. It is therefore possible to provide the driving apparatus 1 capable of generating a sufficient frictional force between the movable unit 12 and the friction drive shaft 16.

Figure 4:
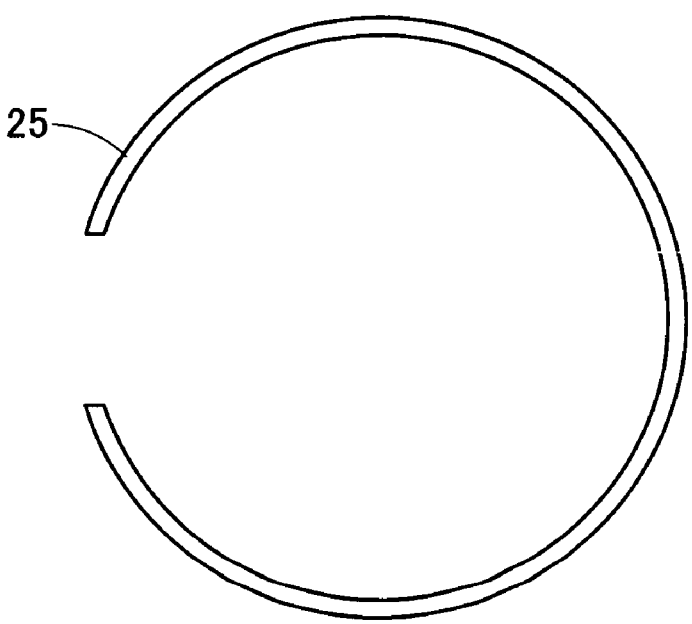
FIG. 4 is an explanatory view showing a spring.
Figure 7:
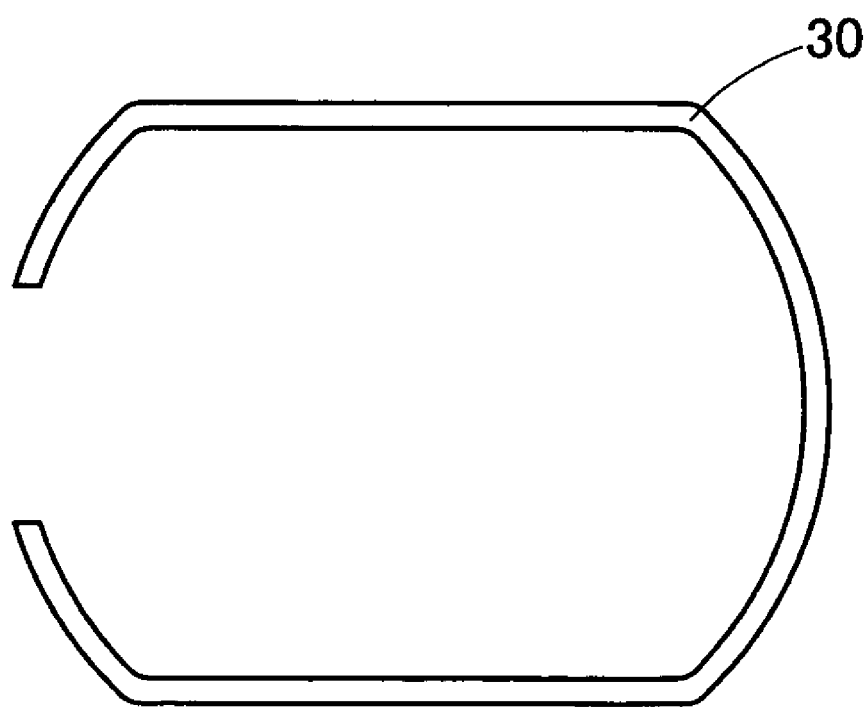
FIG. 7 is an explanatory view of another spring.

The present embodiment is merely an example, which does not limit the present invention thereto. The present invention therefore may be embodied in other specific forms without departing from the essential characteristics thereof. For instance, a spring 30 of an angular oblong shape shown in FIG. 7 may be used instead of the spring 25 of the circular shape shown in FIG. 4. In this case, the annular frame 22, the protrusions 22a and 22b, the frictional connecting member 24, and others are designed to have a shape corresponding to the spring 30.

Further, the shape of the annular frame 22, placement of each member, and others, for example, may be changed. The position of the hinge 23 is not limited to the position at an angle of approx. 90° from both the guide bar 13 and the friction drive shaft 16 and may be at an appropriate position between them. The position of the guide bar 13 may be changed and accordingly the position the guided block 26 may also be changed. The annular frame 22 may be provided with three or more protrusions, instead of the two protrusions 22a and 22b. The outer shape of each of the frictional connecting member 24 and the first and the second frictional connecting blocks 27 and 28 may appropriately be changed.

According to the present invention, it is possible to provide a driving apparatus with good mounting workability and capable of generating a sufficient frictional force between a movable unit and a friction drive shaft by a stable elastic force of an elastic body.

In the present invention, preferably, an annular holding member holding a driven body is provided and a first chuck and a hinge are provided in the holding member. This structure makes it possible to drive an optical lens used as the driven body in a direction of an optical axis thereof by the holding member.

Further, the present invention preferably includes a finger piece provided to be turned together with a second chuck with respect to the hinge. Accordingly, at the time of mounting, the finger piece is pinched and moved to separate the second chuck from the first chuck. The workability can be further improved.

In the present invention, further preferably, engagement portions are formed in facing surfaces of the first and the second chucks, thereby preventing dislocation of the first and second chucks in the axial direction. Thus, when the first and the second chucks are disposed to face each other, they can be held against axial dislocation by the engagement portions. The first and second chucks can surely grasp a drive shaft accordingly.

In the present invention, it is preferable that each of the first and the second chucks is formed with a recess which receives one of both ends of the elastic body, in a surface opposite to the facing surface. Accordingly, both ends of the elastic body received in the recesses respectively, so that the ends can be held surely without disengagement from the first and the second chucks or displacement from each other.

The present invention further preferably includes a projection on the periphery of the holding member to support the elastic body. This projection can serve to correctly support the elastic body on the periphery of holding member.

In the present invention, furthermore, the elastic body is mounted extending around the driven body within a single turn. Thus structured elastic body can elastically be deformed to widen the space between the first and the second chucks, so that the drive shaft can be inserted between the first and the second chucks from a direction perpendicular to the shaft. It is consequently possible to perform the mounting work of the driven body onto the drive shaft after the mounting work of the drive shaft.

What is claimed is:

1. A driving apparatus for moving a driven body according to expansion and contraction of an electromechanical transducer, the driving apparatus comprising:
   a drive shaft connected to one end of the electromechanical transducer;
   a hinge fixedly provided relative to the driven body;
   a first chuck fixedly provided relative to the driven body;
   a second chuck movably provided relative to the hinge to move closer to and away from the first chuck and grasp the drive shaft in cooperation with the first chuck from a direction crossing the expansion and contraction direction of the electromechanical transducer; and
   an elastic body mounted extending around the driven body and pinches the first and the second chucks between both ends of the elastic body.

2. The driving apparatus according to claim 1 further comprising:
   a holding member which holds the driven body, wherein the first chuck and the hinge are provided to the holding member.

3. The driving apparatus according to claim 1 further comprising:
   a finger piece provided to be turnable with the second chuck relative to the hinge.

4. The driving apparatus according to claim 1, wherein the first and the second chucks include facing surfaces provided with engagement portions respectively, the engagement portions engage with each other.

5. The driving apparatus according to claim 1, wherein each of the first and the second chucks is formed with a recess which receives an end of the elastic body, on a surface on an opposite side thereof from the facing surface.

6. The driving apparatus according to claim 1, wherein a protrusion which supports the elastic body is provided on a periphery of the holding member.

7. The driving apparatus according to claim 1, wherein the elastic body extends around the driven body within a single turn.

8. A driving apparatus for moving an optical lens according to expansion and contraction of an electromechanical transducer, the driving apparatus comprising:
   a drive shaft connected to one end of the electromechanical transducer;
   a frame which holds an optical lens;
   a hinge fixedly provided to the annular frame;
   a first chuck fixedly provided to the annular frame;
   a second chuck movably provided relative to the hinge to move closer to and away from the first chuck and grasp the drive shaft in cooperation with the first chuck from a direction crossing the expansion and contraction direction of the electromechanical transducer; and
   an elastic body mounted extending around the annular frame and pinches the first and the second chucks between both ends of the elastic body.

9. The driving apparatus according to claim 8, wherein the optical lens is moved in a direction of an optical axis thereof.

10. A driving apparatus for moving an optical lens according to expansion and contraction of an electromechanical transducer, the driving apparatus comprising:
    a drive shaft connected to one end of the electromechanical transducer;
    an annular frame which holds an optical lens;
    a hinge fixedly provided to the annular frame;
    a first chuck fixedly provided to the annular frame;
    a second chuck movably provided relative to the hinge to move closer to and away from the first chuck and grasp the drive shaft in cooperation with the first chuck from a direction crossing the expansion and contraction direction of the electromechanical transducer; and
    an elastic body mounted extending around the annular frame and pinches the first and the second chucks between both ends of the elastic body,
    wherein each of the first and the second chucks is formed with a recess which receives an end of the elastic body, on a surface on an opposite side thereof from the facing surface.

11. The driving apparatus according to claim 10, wherein a finger piece provided to be turnable with the second chuck relative to the hinge.

12. The driving apparatus according to claim 10, wherein the first and the second chucks include facing surfaces provided with engagement portions respectively, the engagement portions engage with each other.

13. The driving apparatus according to claim 10, wherein a protrusion which supports the elastic body is provided on a periphery of the annular frame.

14. The driving apparatus according to claim 10, wherein the elastic body extends around the driven body within a single turn.

15. The driving of claim 1 further comprising a fixed member adapted to be connected to the other end of the electromechanical transducer.

16. The driving apparatus of claim 1 wherein the elastic body comprises a spring.

17. The driving apparatus of claim 8 further comprising a fixed member adapted to be connected to the other end of the electromechanical transducer.

18. The driving apparatus of claim 8 wherein the elastic body comprises a spring.

19. The driving apparatus of claim 10 further comprising a fixed member adapted to be connected to the other end of the electromechanical transducer.

20. The driving apparatus of claim 10 wherein the elastic body comprises a spring.

* * * * *

UNITED STATES PATENT AND TRADEMARK OFFICE
CERTIFICATE OF CORRECTION

PATENT NO.        : 7,250,707 B2  
APPLICATION NO.   : 11/088369  
DATED             : July 31, 2007  
INVENTOR(S)       : Yasuhiro Okamoto Page 1 of 1

It is certified that error appears in the above-identified patent and that said Letters Patent is hereby corrected as shown below:

In the Claims

Column 8, in claim 15, line 1, after "The driving" insert --apparatus--.

Signed and Sealed this

Fourth Day of December, 2007

JON W. DUDAS  
*Director of the United States Patent and Trademark Office*